United States Patent
Jeon et al.

(10) Patent No.: US 8,848,736 B2
(45) Date of Patent: Sep. 30, 2014

(54) METHOD AND APPARATUS FOR TRANSMITTING DATA

(75) Inventors: Joongbae Jeon, Jechon (KR); Kyoung-Jin Oh, Seoul (KR); Ju-Hyun Park, Yongin-si (KR); Kyo-Jun Ku, Yongin-si (KR); Sunghak Song, Seongnam-si (KR)

(73) Assignee: Samsung SDS Co., Ltd., Seoul (KR)

( * ) Notice: Subject to any disclaimer, the term of this patent is extended or adjusted under 35 U.S.C. 154(b) by 244 days.

(21) Appl. No.: 13/284,513

(22) Filed: Oct. 28, 2011

(65) Prior Publication Data

US 2012/0106571 A1    May 3, 2012

(30) Foreign Application Priority Data

Oct. 29, 2010    (KR) .................... 10-2010-0107333

(51) Int. Cl.
*H04J 3/16*    (2006.01)
*H04L 12/825*    (2013.01)
*H04L 12/801*    (2013.01)

(52) U.S. Cl.
CPC ............. *H04L 47/10* (2013.01); *H04L 47/25* (2013.01)
USPC ......................................... 370/465; 455/436

(58) Field of Classification Search
USPC .......................................... 370/465; 455/436
See application file for complete search history.

(56) References Cited

U.S. PATENT DOCUMENTS

| 2004/0184444 A1* | 9/2004 | Aimoto et al. ............... 370/352 |
| 2006/0239296 A1* | 10/2006 | Jinzaki et al. ................ 370/468 |
| 2010/0165872 A1* | 7/2010 | Jiang ............................. 370/253 |

FOREIGN PATENT DOCUMENTS

| CN | 101098301 A | 1/2008 |
| CN | 101110815 A | 1/2008 |
| CN | 101873192 A | 10/2010 |
| JP | 2004-215199 A | 7/2004 |
| KR | 10-0411248 B1 | 7/2003 |
| KR | 10-2009-0049385 A | 5/2009 |
| KR | 10-2010-0107545 A | 10/2010 |

OTHER PUBLICATIONS

Communication dated Oct. 14, 2011 issued by the Korean Intellectual Property Office in corresponding Korean Application No. 2010-0107333.
Communication dated Mar. 15, 2013 issued by the Japanese Patent Office in counterpart Japanese Patent Application No. 2011-237529.
Communication, dated Nov. 25, 2013, issued by the State Intellectual Property Office of PR China in counterpart Chinese Patent Application No. 201110334602.7.

* cited by examiner

*Primary Examiner* — Wei Zhao
(74) *Attorney, Agent, or Firm* — Sughrue Mion, PLLC

(57) ABSTRACT

A method and an apparatus for transmitting data are provided. The method and the apparatus for transmitting data obtain reception information of a packet received by a reception apparatus on a virtual machine installed on an operating system of the data transmission apparatus, calculate a next sending rate based on the reception information, and transmit a packet according to the next sending rate.

24 Claims, 4 Drawing Sheets

METHOD AND APPARATUS FOR TRANSMITTING DATA

CROSS-REFERENCE TO RELATED PATENT APPLICATION

This application claims priority from Korean Patent Application No. 10-2010-0107333, filed on Oct. 29, 2010, in the Korean Intellectual Property Office, the disclosure of which is hereby incorporated herein by reference in its entirety.

BACKGROUND

1. Field

Apparatuses and methods consistent with exemplary embodiments relate a method and an apparatus for transmitting data, and more particularly, to a method and an apparatus for transmitting data, which calculates a sending rate based on a data arrival rate and controls data transmission.

2. Description of the Related Art

Thanks to the advance of network technology, users increasingly wish to share high capacity multi-media files such as motion picture files, music files, and still image files, as well as diverse information in an online environment. Also, as mobile devices of various forms such as smart phones have been popularized, the use of networks increases. Such an increase in demand requires a technique for transmitting high capacity multimedia files swiftly and exactly.

A method for transmitting data may be divided into a reliable method such as a transmission control protocol (TCP) and an unreliable method such as a user datagram protocol (UDP). The unreliable method is commonly preferred for high-speed transmission of huge data. Methods for transmitting data at a high speed while improving the reliability of data transmission using the unreliable method have been suggested.

Related-art methods for transmitting high capacity files swiftly include a method using time elements such as a round trip time (RTT), queuing delay, and an inter-packet delay time and a method using packet loss elements such as information on whether packets are lost or not and a packet loss rate. A method for controlling a transmission speed (sending rate) using the time elements should measure a time swiftly and exactly, but has difficulty in obtaining correct data if this method is used in a virtual machine on an operating system, and thus is limited in precisely controlling the transmission speed. Therefore, there is a demand for a method for controlling a transmission period in a virtual machine, which uses elements other than the time elements and has compatibility with various operating systems. A method for controlling a transmission speed using the packet loss elements is mainly used when data needs to be transmitted after congestion has already occurred, that is, when data needs to be transmitted at a speed using a bandwidth larger than an available bandwidth of a network. However, this method applies ineffective information and thus may not reflect a state of the network promptly.

SUMMARY

One or more aspects of the exemplary embodiments provide a method and an apparatus for transmitting data, which predict a degree of congestion of a network in advance and control a data transmission period, thereby using a bandwidth effectively and transmitting data more swiftly.

One or more aspects of the exemplary embodiments also provide a method and an apparatus for transmitting data, which transmit data at a high speed using an unreliable transmission protocol, while improving reliability.

According to an aspect of an exemplary embodiment, there is provided a method for transmitting data of a transmission apparatus, the method including: receiving reception information of data from a reception apparatus through a virtual machine installed on an operating system of the transmission apparatus, calculating a next sending rate based on the reception information, and transmitting data according to the next sending rate.

According to an aspect of another exemplary embodiment, there is provided a method for controlling a sending rate of data to be transmitted to a reception apparatus, the method including, if a data arrival rate of the reception apparatus increases, increasing a sending rate of data to be transmitted to the reception apparatus, and if the data arrival rate of the reception apparatus decreases, decreasing the sending rate of the data to be transmitted to the reception apparatus, wherein an increasing rate of the sending rate of the data is in proportion to a delivery rate of the data, wherein a decreasing rate of the sending rate of the data is in inverse proportion to the delivery rate of the data.

According to an aspect of still another exemplary embodiment, there is provided a method for determining a data sending rate at a time (t), the method including: calculating a data arrival rate at a time (t−T) and a data arrival rate at a time (t−2T), if the data arrival rate at the time (t−T) is greater than the data arrival rate at the time (t−2T), determining a value increased from a data sending rate at the time (t−T) as much as a predetermined increasing rate as the data sending rate at the time (t), and if the data arrival rate at the time (t−T) is less than the data arrival rate at the time (t−2T), determining a value decreased from the data sending rate at the time (t−T) as much as a predetermined decreasing rate as the data sending rate at the time (t), wherein T is a control period of a sending rate, wherein the increasing rate is in inverse proportion to the data sending rate at the time (t−T) and the decreasing rate is in proportion to the data sending rate at the time (t−T).

According to an aspect of still another exemplary embodiment, there is provided a computer readable recording medium which records a program for executing at least one of the above-described methods in a computer.

Embodiments can include any, all or none of the following advantages: By predicting a degree of congestion of a network bandwidth, a transmitting period of a packet to be transmitted next or a sending rate, can be adjusted. Accordingly, data loss can be minimized, while avoiding congestion of the network, and data can be transmitted efficiently.

The sending rate can be increased by controlling the transmitting period of the packet on an application layer based on an unreliable transmission protocol. In particular, the sending rate can be increased without replacing a network and thus a cost can be saved.

Even in an environment where computing power is insufficient such as in a virtual machine or mobile devices, packets can be transmitted at a high speed by precisely reflecting a network state swiftly and responsively.

Additional aspects and advantages of the exemplary embodiments will be set forth in the detailed description, will be obvious from the detailed description, or may be learned by practicing the exemplary embodiments.

BRIEF DESCRIPTION OF THE DRAWINGS

The above and other features and advantages will become more apparent by describing in detail exemplary embodiments with reference to the attached drawings in which.

DETAILED DESCRIPTION OF EXEMPLARY EMBODIMENTS

Figure 1:
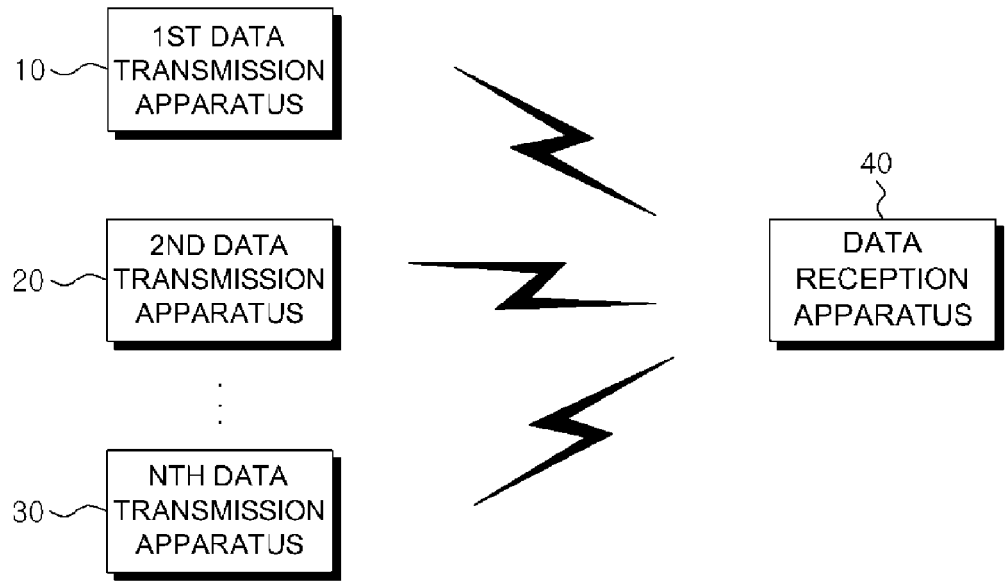
FIG. 1 is a view schematically illustrating a data transmission system according to an exemplary embodiment.

Exemplary embodiments will now be described more fully with reference to the accompanying drawings to clarify aspects, features and advantages of the inventive concept. The exemplary embodiments may, however, be embodied in many different forms and should not be construed as limited to the exemplary embodiments set forth herein. Rather, the exemplary embodiments are provided so that this disclosure will be thorough and complete, and will fully convey the scope of the application to those of ordinary skill in the art. It will be understood that when an element, layer or region is referred to as being "on" another element, layer or region, the element, layer or region can be directly on another element, layer or region or intervening elements, layers or regions.

Also, it will be understood that when a first element (or first component) is referred to as being operated or executed "on" a second element (or second component), the first element (or first component) can be operated or executed in an environment where the second element (second component) is operated or executed or can be operated or executed by interacting with the second element (second component) directly or indirectly.

Also, it will be understood that when an element, component, apparatus or system is referred to as comprising a component consisting of a program or software, the element, component, apparatus or system can comprise hardware (for example, a memory or a central processing unit (CPU)) necessary for executing or operating the program or software or another program or software (for example, a operating system (OS), a driver necessary for driving a hardware), unless the context clearly indicates otherwise.

While not restricted thereto, an exemplary embodiment can be embodied as computer-readable code on a computer-readable recording medium. The computer-readable recording medium is any data storage device that can store data that can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network-coupled computer systems so that the computer-readable code is stored and executed in a distributed fashion.

Also, it will be understood that an element (or component) can be realized by software, hardware, or software and hardware, unless the context clearly indicates otherwise.

The terms used herein are for the purpose of describing particular exemplary embodiments only and are not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, layers, regions, elements, components, and/or groups thereof, but do not preclude the presence or addition of one or more other features, integers, steps, operations, layers, regions, elements, components, and/or groups thereof. As used herein, the term "and/or" includes any and all combinations of one or more of the associated listed items.

FIG. 1 is a view schematically illustrating a data transmission system according to an exemplary embodiment.

Referring to FIG. 1, a data transmission system comprises $1^{st}$ to $n^{th}$ data transmission apparatuses 10, 20, 30 and a data reception apparatus 40. The $1^{st}$ to the $n^{th}$ data transmission apparatuses 10, 20, 30 and the data reception apparatus 40 communicate with one another in a wired and/or wireless manner through a network. The $1^{st}$ to the $n^{th}$ data transmission apparatuses 10, 20, 30 transmit a data packet (hereinafter, referred to as 'data packet', 'data', or 'packet') to the data reception apparatus 40 and receive reception information on the data packet received by the data reception apparatus 40 from the data reception apparatus 40. The $1^{st}$ to the $n^{th}$ data transmission apparatuses 10, 20, 30 predict a state of the network based on the reception information of the data packet and calculate a sending rate of data to be transmitted next based on a result of predicting.

In general, since a transmission speed (sending rate) of a data packet is set in proportion to a size of an available bandwidth of a network, the transmission speed of the data packet is related to the available bandwidth of the network. That is, as the available bandwidth of the network is greater, the data packets are transmitted more swiftly, and, as the available bandwidth is smaller, the data packets are transmitted more slowly. However, it is common that networks having a variety of bandwidths and time delay characteristics are connected to one another in a complex manner and many terminal apparatuses using different bandwidths are connected to one another in each network. Since the available bandwidth among the terminal apparatuses changes on a real time basis, it is difficult to estimate the available bandwidth on a real time basis.

According to an exemplary embodiment, in order to control a sending rate, a method for estimating a transmission speed that is determined to use an available bandwidth to the maximum, that is, a sending rate, is used. Also, if data packets are transmitted at a predetermined transmission speed, elements indicating the state of the network is considered in order to determine whether an available bandwidth is used to the maximum or not. The elements to be considered may comprise a packet arrival rate and a loss rate.

Figure 2:
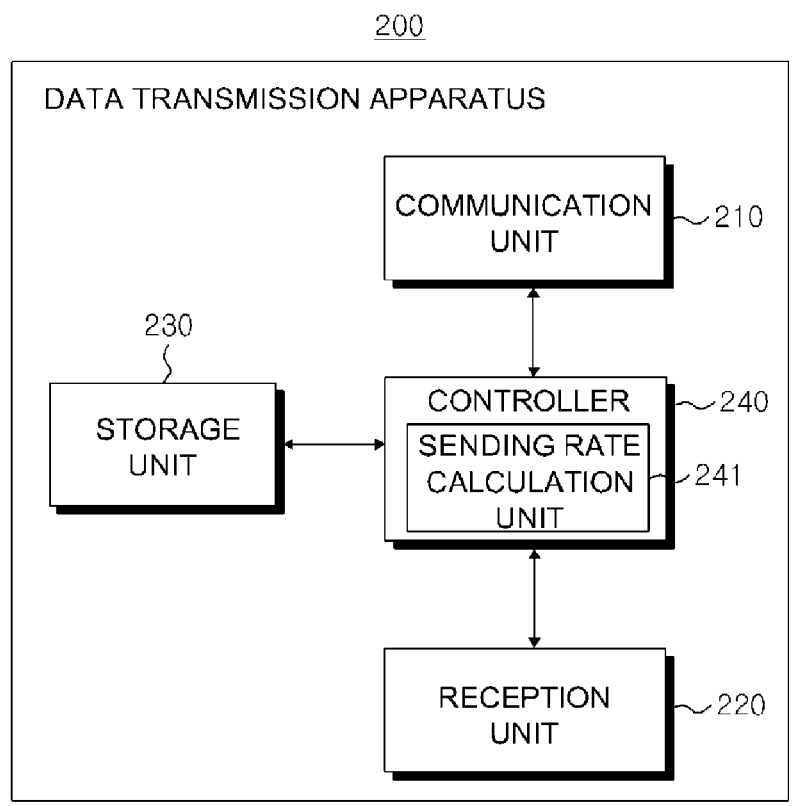
FIG. 2 is a block diagram illustrating a data transmission apparatus according to an exemplary embodiment.

FIG. 2 is a block diagram illustrating a data transmission apparatus 200 according to an exemplary embodiment.

The data transmission apparatus 200 of FIG. 2 may be one of the $1^{st}$ to the $n^{th}$ data transmission apparatuses 10, 20, 30. Referring to FIG. 2, the data transmission apparatus 200 comprises a communication unit 210, a reception unit 220, a storage unit 230, and a controller 240.

The communication unit 210 transmits a data packet to the data reception apparatus 40 according to a current sending rate calculated by a sending rate calculation unit 241 through a network. If the data reception apparatus 40 receives the data packet from the data transmission apparatus 200, the data reception apparatus 40 may transmit reception information on the received data packet (hereinafter, referred to as 'reception information of the data packet') to the communication unit 210. The reception information of the data packet may be at least one of the number of packets received by the data reception apparatus 200 for a predetermined time, a time interval at which the reception information is collected, and a packet arrival rate.

The reception unit 220 may be an application that is operated on a virtual machine installed on an operating system of the data transmission apparatus 200 and may perform an operation of receiving the reception information of the packet from the data reception apparatus 40. According to an exemplary embodiment, the reception unit 220 may be included in an application unit 340 to be explained with reference to FIG. 3 below.

The storage unit 230 may store programs and/or data necessary for performing an overall operation of the data transmission apparatus 200. Also, the storage unit 230 may store data to be transmitted to the data reception apparatus 40 and/or the reception information of the data packet received from the data reception apparatus 40.

The controller 240 controls the operations of the data transmission apparatus 200 using the programs stored in the storage unit 230. For example, if the reception unit 220 receives the reception information of the data packet, the controller 240 predicts and calculates a sending rate of data to be transmitted next (hereinafter, referred to as a 'next sending rate') based on the reception information of the packet. The next sending rate may be used in transmitting a next data packet that is ready to be transmitted. The communication unit 210 is controlled by the controller 240 to transmit the next data packet using the next sending rate calculated by the controller 240.

According to an exemplary embodiment, the controller 240 may calculate the sending rate at a predetermined time interval. For example, if the controller 240 calculates the sending rate at a predetermined time interval (T[sec]), the sending rate of the data packet at a time (t[sec]) may be calculated as follows:

The controller 240 calculates a data arrival rate at a time (t−T[sec]) and a data arrival rate at a time (t−2T[sec]). If the data arrival rate at the time (t−T[sec]) is greater than or equal to the data arrival rate at the time (t−2T[sec]), a value increased from a data transmission speed at the time (t−T[sec]) as much as a predetermined rate is calculated as a data transmission speed (that is, a sending rate) at the time (t[sec]). The increasing rate is set to be in inverse proportion to a data sending rate at the time (t−T[sec]) and to be in proportion to an average delivery rate of data and a gradient of arrival rate change.

On the other hand, if the data arrival rate at the time (t−T[sec]) is less than the data arrival rate at the time (t−2T[sec]), the controller 240 calculates a value decreased from the data sending rate at the time (t−T[sec]) as much as a predetermined rate as the data sending rate at the time (t[sec]). The decreasing rate is set to be in inverse proportion to the average delivery rate of the data and to be in proportion to the gradient of arrival rate change of the data and the data sending rate at the time (t−T[sec]).

The communication unit 210 performs a transmitting operation according to the sending rate calculated by the controller 240, as described above. That is, if the data arrival rate of the data reception apparatus increases, the communication unit 210 increases the sending rate of the data to be transmitted to the data reception apparatus as much as the predetermined rate, and, if the data arrival rate of the data reception apparatus decreases, the communication unit 210 decreases the sending rate of the data to be transmitted to the data reception apparatus as much as the predetermined rate. The increasing rate of the data sending rate may be set in the above-described method.

Although the controller 240 controls the data sending rate periodically in the above embodiment, this is merely an example and the controller 240 may control the data sending rate in an aperiodic manner.

According to an exemplary embodiment, the controller 240 may comprise the sending rate calculation unit 241 and the sending rate calculation unit 241 may calculate a sending rate of data to be transmitted next. According to an exemplary embodiment, the sending rate calculation unit 241 calculates a gradient of arrival rate change based on the number of data packets, and calculates a next sending rate based on the gradient of arrival rate change, a current sending rate, and a delivery rate. A method for calculating the next sending rate will be explained in detail.

In the exemplary embodiment of FIG. 2, the sending rate calculation unit 241 is included in the controller 240. However, this should not be considered as limiting. For example, the sending rate calculation unit 241 may not be included in the controller 240 and may be an independent element.

Figure 3:
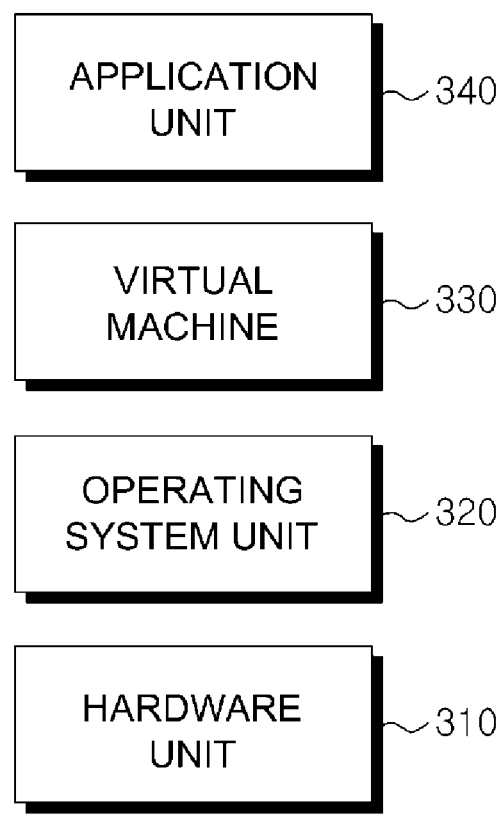
FIG. 3 is a view to explain the data transmission apparatus according to the exemplary embodiment.

FIG. 3 is a view to explain the data transmission apparatus 200 according to the exemplary embodiment.

Referring to FIG. 3, the data transmission apparatus 200 comprises a hardware unit 310, an operating system unit 320, a virtual machine 330, and an application unit 340. In FIG. 3, one operating system unit 320, one virtual machine 330, and one application unit 340 are illustrated for the convenience of explanation. However, the numbers of these elements are not limited.

The hardware unit 310 may comprise a storage device such as a hard disk driver (HDD), an input device such as a keyboard and a mouse, and an output device such as a speaker and a display, and/or other hardware devices.

The operating system unit 320 serves as an interface between the hardware unit 310 and the virtual machine 330, supports the application unit so that a program of the application unit easily uses the hardware, and manages hardware and software resources so as to maximize efficiency of the data transmission apparatus 200.

The virtual machine 330 may control programs to be executed in various types of operating systems. For example, the virtual machine 330 may be a Java virtual machine.

The application unit 340 may control a sending rate according to an exemplary embodiment.

Hereinafter, a method for calculating a next sending rate by the sending rate calculation unit 241 of FIG. 2 will be explained.

The sending rate calculation unit 241 may predict a congestion state of a network using two criteria based on a packet arrival rate of the data reception apparatus. The two criteria are a delivery rate (DR) and a gradient of arrival rate change (GARC) of a packet.

The data packet arrival rate used by the sending rate calculation unit 241 indicates a speed at which the data reception apparatus receives the packet, and may be directly provided by the data reception apparatus or may be calculated by the sending rate calculation unit 241 based on the number of packets received by the data reception apparatus.

The delivery rate (DR) or an average delivery rate (ADR) calculated based on the data packet arrival rate indicates a capability of transmitting packets coming into a network to a receiving side successfully on a hourly basis, that is, indicates a packet processing rate of a current network. Accordingly, the controller 240 may predict a degree of congestion of the current network based on the delivery rate (DR). Also, in determining a delivery rate at a specific time (i), the sending rate calculation unit 241 may use the average delivery rate (ADR) using a moving average method in order to reflect a past situation (that is, a previous delivery rate). Following equation 1 is to calculate a delivery rate (DR) and equation 2 is to calculate an average delivery rate:

$$DR_i = \frac{Rate_{Ai}}{Rate_{Si}}$$ [Equation 1]

$i = 1, 2, 3, \ldots n$ ($n$: natural number)

Referring to equation 1, the delivery rate (DR) is a ratio of a packet arrival rate of the data reception apparatus to a packet sending rate of the communication unit 210. $DR_i$ is a delivery rate at the time (i), $Rate_{Si}$ is a sending rate at the time (i), and $Rate_{Ai}$ is a packet arrival rate at the time (i).

$$ADR_i = \alpha \times DR_{i-2} + \beta \times DR_{i-1} + \gamma \times DR_i, (\alpha+\beta+\gamma=1), \gamma>\beta>\alpha$$ [Equation 2]

Referring to equation 2, $ADR_i$ is an average delivery rate at the time (i), $DR_i$ is a delivery rate at the time (i), $DR_{i-1}$ is a delivery rate at a time (i−1), $DR_{i-2}$ is a delivery rate at a time (i−2), and $\alpha$, $\beta$, $\gamma$ are weight values assigned to the delivery rates. The time (i) is a time at which the packet is transmitted at a current sending rate.

If the reception information of the packet is the number of packets, the sending rate calculation unit 241 calculates the packet arrival rate based on the number of packets and calculates a gradient of arrival rate change (GARC) based on the calculated packet arrival rate. The gradient of arrival rate change (GARC) may be used to predict a future network situation. For example, if the packet arrival rate is in an increasing mode, it is predicted whether the increasing ratio of the sending rate increases, is retained, or decreases, and, if the packet arrival rate is in a decreasing mode, it is predicted whether the decreasing ratio of the sending rate increases, is retained, or decreases.

Figure 4:
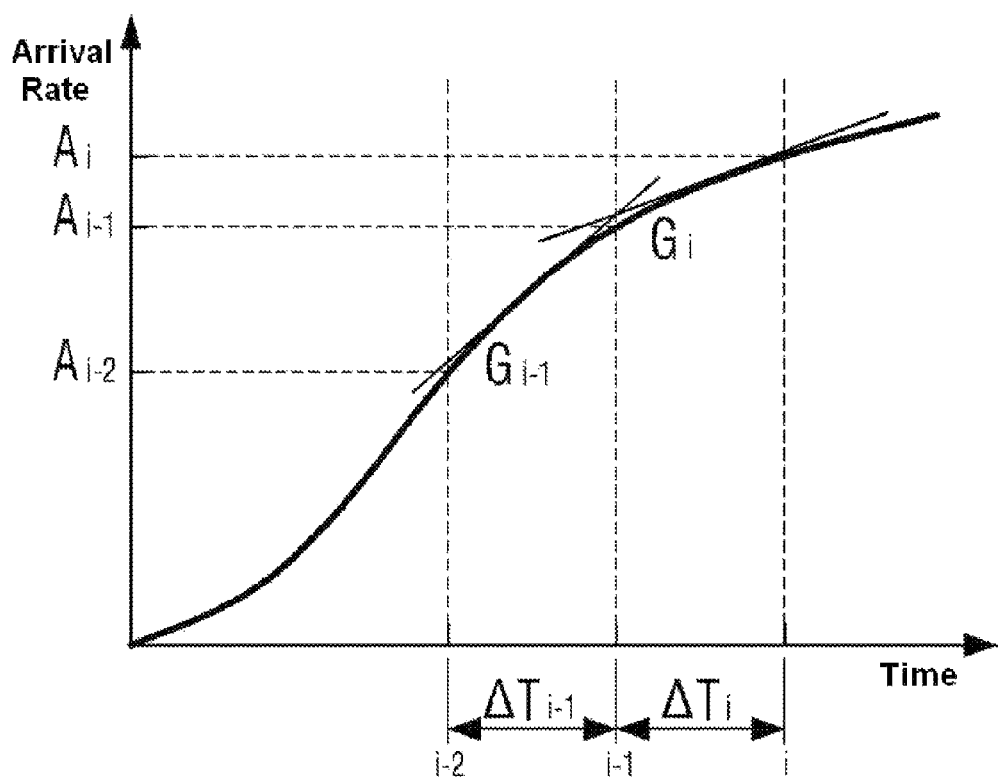
FIG. 4 is a view to explain a method for calculating a gradient of arrival rate change.

FIG. 4 is a view to explain a method for calculating a gradient of arrival rate change.

Referring to FIG. 4, a horizontal axis indicates a time during which packets are transmitted, and a vertical axis indicates a packet arrival rate according to the time. A gradient of arrival rate change ($GARC_i$) may be defined as a ratio of an amount of arrival rate change ($G_i$) of a current section (i~i−1) to an amount of arrival rate change ($G_{i-1}$) of a previous section (i−1~i−2). This is expressed by following equation 3:

$$GARC_i = \frac{G_i}{G_{i-1}} = \frac{\frac{A_i - A_{i-1}}{\Delta T_i}}{\frac{A_{i-1} - A_{i-2}}{\Delta T_{i-1}}}$$ [Equation 3]

In equation 3, $GARC_i$ is a gradient of arrival rate change at a time (i), $G_i$ is a degree of arrival rate change at the time (i), $G_{i-1}$ is a degree of arrival rate change at a time (i−1) which precedes the time (i), $A_i$ is an arrival rate at the time (i), $A_{i-1}$ is an arrival rate at the time (i−1), $\Delta T_i$ is a time difference between the time (i) and the time (i−1), during which the arrival rate change is measured, and $\Delta T_{i-1}$ is a time difference between the time (i−1) and the time (i−2), during which the arrival rate change is measured.

Referring to FIG. 4 and equation 3, the gradient of arrival rate change ($GARC_i$) is calculated by applying a secondary differential principle of an arrival rate graph and is a base for predicting a future network state. For example, if the arrival rate is expressed by an increasing curve in a convex form, there is a high probability that a network situation will get better, and, if the arrival rate is expressed by a decreasing curve in a convex form, the network abruptly becomes congested.

Table 1 below shows examples of the sending rate, the packet arrival rate, the delivery rate, and the gradient of arrival rate change at each time:

TABLE 1

| Time | Sending Rate ($Rate_{Si}$) | Arrival Rate ($Rate_{Ai}$) | Amount of Arrival Rate Change | Delivery Rate (DR) | Gradient of Arrival Rate Change (GARC) |
|---|---|---|---|---|---|
| i−2 | 80 | 75 |  | 0.94 |  |
| i−1 | 90 | 84 | 9 | 0.93 |  |
| i | 100 | 87 | 3 | 0.87 | ³⁄₉ = ⅓ |

The controller 240 predicts a network situation based on the delivery rate and the gradient of arrival rate change at the three points of time. The controller 240 increases the packet sending rate during the section [i−2]~[i] and accordingly the packet arrival rate at the data reception apparatus increases. However, according to the amount of arrival rate change, the increasing rate of the packet arrival rate is decreased from 9 to 3 and this means that there is a high probability that the network situation will become worse in the future.

Accordingly, the sending rate calculation unit 241 predicts the future network situation using the packet arrival rate, the delivery rate (DR), the gradient of arrival rate change (GARC), and the current sending rate ($Rate_{Si}$), and calculates the next sending rate based on a result of predicting. According to an exemplary embodiment, the network situation may be predicted based on the packet arrival rate, and also, efficiency of packet transmission increases and a high arrival rate can be maintained by actively increasing the transmission speed and simultaneously minimizing a packet loss rate.

The sending rate calculation unit 241 may calculate the next sending rate using following equation 4:

$$Rate_{Si+1} = Rate_{Si} + k \times |GARC_i| \times \left(\frac{ADR_i}{Rate_{Si}} \times STEP\right)^k$$ [Equation 4]

wherein $Rate_{Si+1}$ is a next sending rate to be used at a time (i+1), $Rate_{Si}$ is a sending rate at a time (i), $GARC_i$ is a gradient of arrival rate change, $ADR_i$ is an average delivery rate, 'k' is one of +1 and −1, and 'STEP' is a variable that changes according to a network environment and indicates a reference increasing or decreasing rate. If the amount of arrival rate change has a (+) value, 'k' is +1, and, if the amount of arrival rate change has a (−) value, 'k' is −1. An algorithm for calculating the next sending rate may comprise an increasing mode and a decreasing mode according to the amount of arrival rate change. That is, if the packet arrival rate increases or is maintained, the algorithm is in the increasing mode, and, if the packet arrival rate decreases, the algorithm is in the decreasing mode.

It can be seen from equation 4 that the sending rate is determined based on the current sending rate ($Rate_{Si}$), the delivery rate (DR), and the gradient of arrival rage change (GARC). The delivery rate herein may be an average delivery rate. The increasing or decreasing rate of the sending rate indicates a rate at which the next sending rate increases or decreases with reference to the current sending rate.

Hereinafter, points to be considered in calculating the sending rate according to one or more exemplary embodiments will be explained.

First, the increasing or decreasing rate of the sending rate ($\text{Rate}_{Si}$) may be determined in a range so that a packet loss rate can be reduced. For example, in the case that the current sending rate ($\text{Rate}_{Si}$) is higher than the previous sending rate, the increasing rate of the sending rate in the increasing mode of the packet arrival rate decreases in order to maintain stability, and the decreasing rate of the sending rate in the decreasing mode of the packet arrival rate increases in order to reduce an amount of packet inflow and minimize the packet loss.

On the other hand, in the case that the current sending rate ($\text{Rate}_{Si}$) is lower than the previous sending rate ($\text{Rate}_{Si-1}$), the increasing rate of the sending rate in the increasing mode of the packet arrival rate increases, and, the decreasing rate of the sending rate in the decreasing mode of the packet arrival rate decreases. The increasing or decreasing rate is determined on the contrary to the case of the high sending rate in the increasing and decreasing modes.

Second, the increasing or decreasing rate of the sending rate may be determined according to the delivery rate (DR). The delivery rate refers to a packet processing rate of a network and reflects a current network state. Accordingly, in the case that the delivery rate is high, the increasing rate of the sending rate in the increasing mode of the packet arrival rate increases and the decreasing rate of the sending rate in the decreasing mode of the packet arrival rate decreases, so that available resources can be sufficiently utilized. On the other hand, in the case that the delivery rate (DR) is low, the increasing rate of the sending rate in the increasing mode of the packet arrival rate decreases and the decreasing rate of the sending rate in the decreasing mode of the packet arrival rate increases, so that appropriate measures can be taken in response to a congestion state of the network.

Third, the increasing or decreasing rate of the sending rate may be determined according to the gradient of arrival rate change (GARC). The gradient of arrival rate change (GARC) reflects a future network situation and thus may predict that the network state will be maintained as an absolute value of the gradient of arrival rate change (GARC) increases. More specifically, if the gradient of arrival rate change (GARC) is greater than 1 in the same control mode (increasing mode or decreasing mode), it is determined that the network will maintain its current state (increasing or decreasing state of the packet arrival rate). On the other hand, if the gradient of arrival rate change (GARC) is less than 1, it is determined that the network will change the increasing state of the packet arrival rate to the decreasing state or vice versa. Accordingly, the increasing or decreasing rate of the sending rate is set to be in proportion to the absolute value of the gradient of arrival rate change (GARC) in the increasing mode or decreasing mode, so that stability of packet transmission can be improved.

The method for determining the next sending rate is expressed by equation 4 based on the above-described three points based on which the increasing or decreasing rate of the sending rate is determined in each mode of the increasing mode and the decreasing mode of the packet arrival rate. 'k' in equation 4 changes according to the increasing mode or the decreasing mode. Equation 4 expresses the increasing or decreasing of the sending rate according to 'k' as a mathematical notation. Accordingly, the average delivery rate and the current sending rate, which are elements for determining the increasing or decreasing rate in each mode, may be replaced with a reciprocal number. The gradient of arrival rate change applies only the absolute value proportionally regardless of whether the arrival rate is in the increasing mode or decreasing mode. Equation 4 may be replaced with equations 5 and 6 according to 'k' and the increasing or decreasing mode:

$$\text{Rate}_{Si+1} = \text{Rate}_{Si} + |GARC_i| \times \left( \frac{ADR_i}{\text{Rate}_{Si}} \times STEP \right) \quad \text{[Equation 5]}$$

$$\text{Rate}_{Si+1} = \text{Rate}_{Si} - |GARC_i| \times \left( \frac{\text{Rate}_{Si}}{ADR_i} \times STEP \right) \quad \text{[Equation 6]}$$

Equation 5 is a result of applying k=1 to equation 4 in the increasing mode of the packet arrival rate, and equation 6 is a result of applying k=−1 to equation 4 in the decreasing mode of the packet arrival rate.

Referring to equations 4 to 6, as the probability that the network situation will get better increases, that is, as |GARC| increases, or as the packet processing rate of the current network is higher, that is, as the average delivery rate (ADR) is higher, the increasing rate of the sending rate increases. Also, as the probability that the network will become worse increases, that is, as |GARC| increases, or as the packet processing rate of the current network is lower, that is, as the average delivery rate (ADR) is lower, the decreasing rate of the sending rate increases.

Figure 5:
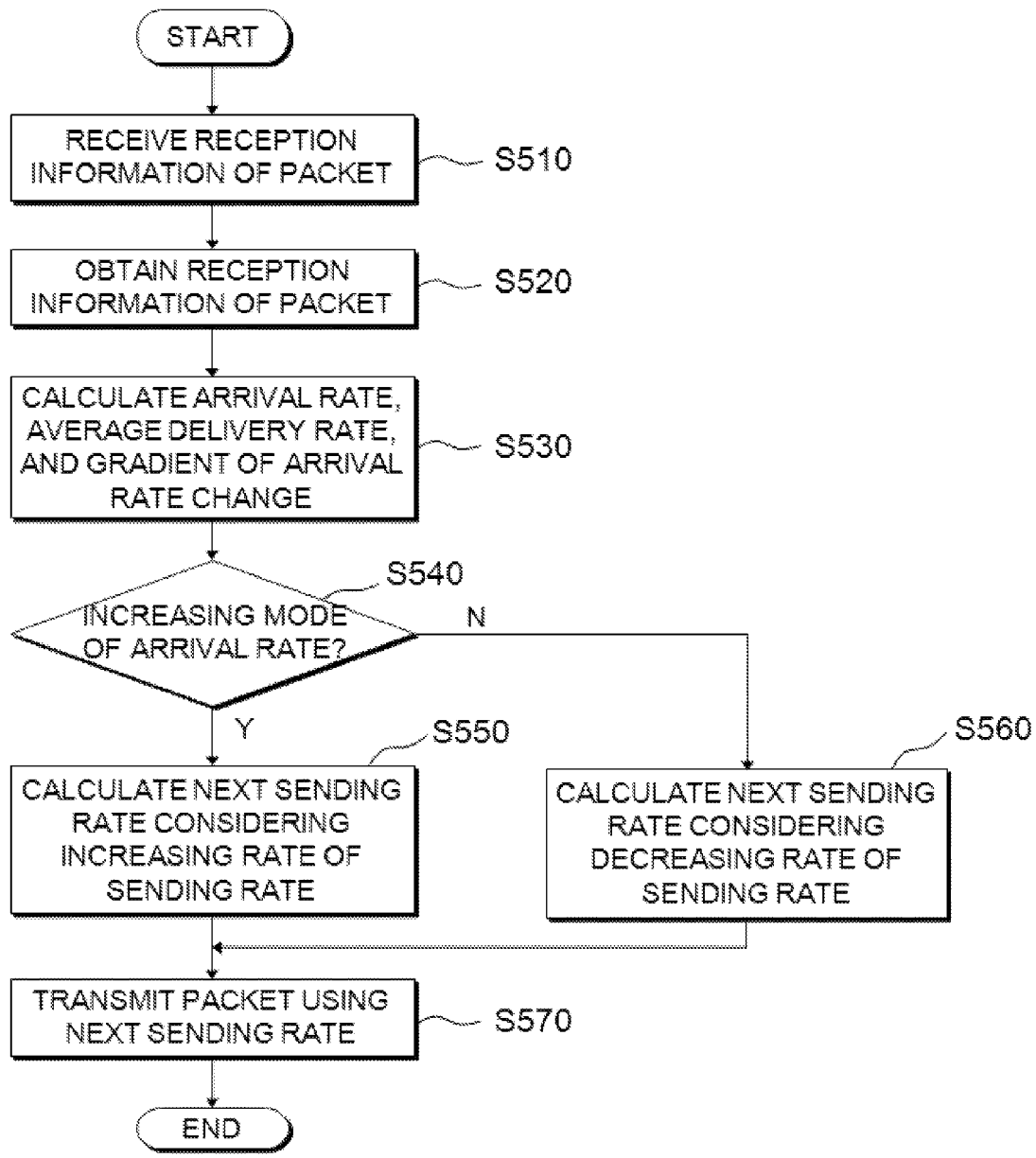
FIG. 5 is a flowchart illustrating a method for transmitting data according to an exemplary embodiment.

FIG. 5 is a flowchart illustrating a method for transmitting a packet according to an exemplary embodiment.

The method for transmitting the packet of FIG. 5 may be performed by the controller 240 of the data transmission apparatus 200 described above with reference to FIG. 2 or at least one processor.

In operation S510, the data transmission apparatus 10 transmits a packet to the data reception apparatus 40 and then receives reception information on the packet from the data reception apparatus 40 and stores the reception information. The reception information of the packet may be transmitted at the request of the data transmission apparatus 10 or transmitted by the data reception apparatus 40 periodically, and may comprise at least one of the number of received packets, a time interval at which the reception information is collected, and information on a packet arrival rate.

In operation S520, the data transmission apparatus 10 obtains the reception information of the packet through a virtual machine installed on an operating system of the data transmission apparatus 10.

In operation S530, the data transmission apparatus 10 calculates an arrival rate, an average delivery rate, and a gradient of arrival rate change based on the obtained reception information of the packet. The data transmission apparatus 10 may calculate values of the arrival rate, the average delivery rate and the gradient of arrival rate change using equations 1 to 3.

In operation S540, the data transmission apparatus 10 identifies the arrival rates of the packets and determines a mode of the packet arrival rate. For example, the data transmission apparatus 10 determines whether the packet arrival rate is in an increasing mode or decreasing mode based on an amount of packet arrival rate change as shown in table 1.

If the packet arrival rate is in the increasing mode, the data transmission apparatus 10 calculates a next sending rate considering an increasing rate of the sending rate in operation S550. That is, the data transmission apparatus 10 calculates the next sending rate reflecting the increasing rate of the sending rate using equation 4 or 5.

On the other hand, if the packet arrival rate is in the decreasing mode, the data transmission apparatus 10 calculates a next sending rate considering a decreasing rate of the sending rate in operation S560. That is, the data transmission apparatus 10 calculates the next sending rate reflecting the decreasing rate of the sending rate using equation 4 or 6.

In operation S570, the data transmission apparatus 10 transmits a next packet to the data reception apparatus 40 using the next sending rate calculated in operation S550 or S560.

According to one or more exemplary embodiments described above, the two criteria, the average delivery rate and the gradient of arrival rate change, may be defined based on the packet arrival rate, and the maximum sending speed at which the available bandwidth of the network can be used in the unreliable transmission protocol can be exactly calculated using the two criteria.

While exemplary embodiments have been particularly shown and described above, it will be understood by those of ordinary skill in the art that various changes in form and details may be made therein without departing from the spirit and scope of the present inventive concept as defined by the following claims.

What is claimed is:

1. A method for transmitting data of a transmission apparatus, the method comprising:
    receiving reception information of the data from a reception apparatus on a virtual machine installed on an operating system of the transmission apparatus; and
    calculating a next sending rate based on the reception information,
    wherein the reception information of the data comprises at least one of an arrival rate of the data and a number of data packets received by the reception apparatus,
    wherein the calculating the next sending rate comprises calculating a gradient of arrival rate change based on the number of data packets,
    wherein the calculating comprises decreasing the next sending rate of the data in inverse proportion to a delivery rate of the data if the arrival rate of data decreases at the reception apparatus and increasing the next sending rate of the data in proportion to a delivery rate of the data if the arrival rate of data increases at the reception apparatus, and
    wherein the calculating comprises increasing the next sending rate in proportion to an average delivery rate of the data and the gradient of arrival rate change, and in inverse proportion to a current sending rate of the data.

2. The method as claimed in claim 1, wherein the calculating the gradient of arrival rate change comprises calculating an arrival rate based on the number of data packets and calculating the gradient of arrival rate change based on the calculated arrival rate.

3. The method as claimed in claim 1, wherein the gradient of arrival rate change is calculated by following equation:

$$GARC_i = \frac{G_i}{G_{i-1}} = \frac{\frac{A_i - A_{i-1}}{\Delta T_i}}{\frac{A_{i-1} - A_{i-2}}{\Delta T_{i-1}}}$$

wherein $GARC_i$ is a gradient of arrival rate change, $G_i$ is a degree of arrival rate change at a time (i), $G_{i-1}$ is a degree of arrival rate change at a time (i−1) which precedes the time (i), $A_i$ is an arrival rate at the time (i), $A_{i-1}$ is an arrival rate at the time (i−1), $A_{i-2}$ is an arrival rate at the time (i−2), $\Delta T_i$ is a time difference between the time (i) and the time (i−1), and $\Delta T_{i-1}$ is a time difference between the time (i−1) and a time (i−2).

4. The method as claimed in claim 1, wherein the calculating the next sending rate comprises:
    calculating a gradient of arrival rate change based on a number of data packets; and
    calculating the next sending rate based on the gradient of arrival rate change, a current sending rate, and a delivery rate,
    wherein the delivery rate is calculated by following equation:

$$DR_i = \frac{Rate_{Ai}}{Rate_{Si}}$$

$i = 1, 2, 3, \ldots n$ ($n$: natural number)

wherein $DR_i$ is a delivery rate at a time (i), $Rate_{Si}$ is a sending rate at the time (i), $Rate_{Ai}$ is an arrival rate at the time (i).

5. The method as claimed in claim 4, wherein the delivery rate is an average delivery rate which is calculated by following equation:

$$ADR_i = \alpha \times DR_{i-2} + \beta \times DR_{i-1} + \gamma \times DR_i, (\alpha+\beta+\gamma=1), \gamma > \beta > \alpha$$

wherein $ADR_i$ is an average delivery rate at the time (i), $DR_i$ is a delivery rate at the time (i), $DR_{i-1}$ is a delivery rate at a time (i−1), $DR_{i-2}$ is a delivery rate at a time (i−2), and $\alpha$, $\beta$, and $\gamma$ are weight values assigned to delivery rates.

6. The method as claimed in claim 1, wherein the sending rate is calculated by following equation:

$$Rate_{Si+1} = Rate_{Si} + k \times |GARC_i| \times \left(\frac{ADR_i}{Rate_{Si}} \times STEP\right)^k$$

wherein $Rate_{Si+1}$ is a sending rate to be used at a time (i+1), $Rate_{Si}$ is a sending rate used at a time (i), $GARC_i$ is a gradient of arrival rate change, $ADR_i$ is an average delivery rate, 'k' is one of +1 and −1, and STEP is a variable which changes according to an environment of a network.

7. The method as claimed in claim 6, wherein, if the arrival rate of the packet increases, is +1, and, if the arrival rate of the packet decreases, 'k' is −1.

8. An apparatus for transmitting data, comprising:
    a reception unit which receives reception information of the data from a reception apparatus on a virtual machine installed on an operating system of the apparatus for transmitting the data; and
    a controller which calculates a next sending rate based on the reception information,
    wherein the reception information of the packet is at least one of an arrival rate of the packet and a number of packets received by the reception apparatus,
    wherein the controller calculates a gradient of arrival rate change based on the number of packets,
    wherein the controller calculates the next sending rate by decreasing the next sending rate of the data in inverse proportion to a delivery rate of the data if the arrival rate of the packet decreases at the reception apparatus and increasing the next sending rate of the data in proportion to a delivery rate of the data if the arrival rate of the packet increases at the reception apparatus, and
    wherein the controller increases the next sending rate in proportion to an average delivery rate of the packet and the gradient of arrival rate change, and in inverse proportion to a current sending rate of the packet.

9. The apparatus as claimed in claim 8, wherein the controller calculates an arrival rate based on the number of packets and calculates the gradient of arrival rate change based on the calculated arrival rate.

10. The apparatus as claimed in claim 8, wherein the gradient of arrival rate change is calculated by following equation:

$$GARC_i = \frac{G_i}{G_{i-1}} = \frac{\frac{A_i - A_{i-1}}{\Delta T_i}}{\frac{A_{i-1} - A_{i-2}}{\Delta T_{i-1}}}$$

wherein $GARC_i$ is a gradient of arrival rate change, $G_i$ is a degree of arrival rate change at a time (i), $G_{i-1}$ is a degree of arrival rate change at a time (i−1) which precedes the time (i), $A_i$ is an arrival rate at the time (i), $A_{i-1}$ is an arrival rate at the time (i−1), $A_{i-2}$ is an arrival rate at the time (i−2), $\Delta T_i$ is a time difference between the time (i) and the time (i−1), and $\Delta T_{i-1}$ is a time difference between the time (i−1) and a time (i−2).

11. The apparatus as claimed in claim 10, wherein the controller calculates the gradient of arrival rate change based on the number of packets and calculates the next sending rate based on the gradient of arrival rate change, the current sending rate, and a delivery rate,
wherein the delivery rate is calculated by following equation $$DR_i = \frac{Rate_{Ai}}{Rate_{Si}}$$

$i = 1, 2, 3, \ldots n(n$: natural number)

wherein $DR_i$ is a delivery rate at the time (i), $Rate_{Si}$ is a sending rate at the time (i), $Rate_{Ai}$ is an arrival rate at the time (i).

12. The apparatus as claimed in claim 11, wherein the delivery rate is an average delivery rate which is calculated by following equation:

$ADR_i = \alpha \times DR_{i-2} + \beta \times DR_{i-1} + \gamma \times DR_i, (\alpha+\beta+\gamma=1), \gamma > \beta > \alpha$ wherein $ADR_i$ is an average delivery rate at the time (i), $DR_i$ is a delivery rate at the time (i), $DR_{i-1}$ is a delivery rate at a time (i−1), $DR_{i-2}$ is a delivery rate at a time (i−2), and $\alpha$, $\beta$, and $\gamma$ are weight values assigned to delivery rates.

13. The apparatus as claimed in claim 8, wherein the sending rate is calculated by following equation:

$$Rate_{Si+1} = Rate_{Si} + k \times |GARC_i| \times \left(\frac{ADR_i}{Rate_{Si}} \times STEP\right)^k$$

wherein $Rate_{Si+1}$ is a sending rate to be used at a time (i+1), $Rate_{Si}$ is a sending rate used at a time (i), $GARC_i$ is a gradient of arrival rate change, $ADR_i$ is an average delivery rate, 'k' is one of +1 and −1, and STEP is a variable which changes according to an environment of a network.

14. The apparatus as claimed in claim 13, wherein, if the arrival rate of the packet increases, is +1, and if the arrival rate of the packet decreases, is −1.

15. A method for controlling a sending rate of data to be transmitted to a reception apparatus, the method comprising:
increasing the sending rate of data to be transmitted to the reception apparatus when a data arrival rate of the reception apparatus increases; and
decreasing the sending rate of the data to be transmitted to the reception apparatus when the data arrival rate of the reception apparatus decreases,
wherein an increasing rate of the sending rate of the data is in proportion to a delivery rate of the data,
wherein a decreasing rate of the sending rate of the data is in inverse proportion to the delivery rate of the data, and
wherein the increasing rate is in proportion to an average delivery rate of the data and a gradient of change of the arrival rate, and is in inverse proportion to a current sending rate of the data.

16. The method as claimed in claim 15, wherein the decreasing rate is in inverse proportion to an average delivery rate of the data and is in proportion to a gradient of change of the arrival rate and a current sending rate of the data.

17. The method as claimed in claim 15, wherein, if the data arrival rate of the reception apparatus is not changed, the sending rate of the data to be transmitted to the reception apparatus increases, and the increasing rate of the sending rate is in proportion to an average delivery rate of the data and a gradient of change of the arrival rate and is in inverse proportion to a current sending rate of the data.

18. A method for determining a data sending rate at a time (t), the method comprising:
calculating a data arrival rate at a time (t−T) and a data arrival rate at a time (t−2T),
wherein, when the data arrival rate at the time (t−T) is greater than the data arrival rate at the time (t−2T), determining a value increased from a data sending rate at the time (t−T) as much as a predetermined increasing rate as the data sending rate at the time (t) as,
wherein, when the data arrival rate at the time (t−T) is less than the data arrival rate at the time (t−2T), determining a value decreased from the data sending rate at the time (t−T) as much as a predetermined decreasing rate as the data sending rate at the time (t),
wherein T is a control period of a sending rate,
wherein the increasing rate is in inverse proportion to the data sending rate at the time (t−T) and the decreasing rate is in proportion to the data sending rate at the time (t−T) and
wherein the increasing rate is in proportion to an average delivery rate of the data and a gradient of change of the arrival rate, and is in inverse proportion to the data sending rate at the time (t−T).

19. The method as claimed in claim 18, wherein, when the data arrival rate at the time (t−T) is the same as the data arrival rate at the time (t−2T), determining a value increased from the data sending rate at the time (t−T) as much as a predetermined increasing rate as the data sending rate at the time (t).

20. The method as claimed in claim 18,
wherein the decreasing rate is in proportion to the data sending rate at the time (t−T) and is in inverse proportion to the data delivery rate.

21. The method as claimed in claim 18, wherein the decreasing rate is in inverse proportion to an average delivery rate of the data and is in proportion to a gradient of change of the data arrival rate and the data sending rate at the time (t−T).

22. A non-transitory computer readable recording medium containing thereon program for executing the method of claim 1.

23. The method as claimed in claim 1, further comprising:
transmitting the data according to the next sending rate.

24. The apparatus as claimed in claim 8, further comprising:
a communication unit which transmits a packet according to the next sending rate.

* * * * *